May 12, 1925.

L. BLUMSCHEIN 1,537,401

CONTROLLING OR REGULATING DEVICE FOR PROPELLERS

Filed Nov. 18, 1924

Inventor
Ludwig Blumschein

Patented May 12, 1925.

1,537,401

UNITED STATES PATENT OFFICE.

LUDWIG BLUMSCHEIN, OF BERLIN-JOHANNISTHAL, GERMANY.

CONTROLLING OR REGULATING DEVICE FOR PROPELLERS.

Application filed November 18, 1924. Serial No. 750,569.

*To all whom it may concern:*

Be it known that I, LUDWIG BLUMSCHEIN, a citizen of the German Republic, residing at Berlin-Johannisthal, Germany, have invented certain new and useful Improvements in Controlling or Regulating Devices for Propellers, of which the following is a specification.

The present invention relates to means for controlling or regulating the effects of gases or liquids on the surfaces of stream line bodies such as propellers. In various engines, such as turbines driven by wind, water or steam, wind motors, or with driving propellers and sailing or steering surfaces, the forces of the currents of gases, liquids or any other driving medium are taken up by the surfaces of such propellers or turbine blades and the regulating or controlling of the speed has heretofore been largely effected by varying the velocity of the driving medium, or by altering the angularity or camber of said surfaces. In the present invention, a preferred form of which has been disclosed, a disturbance of the driving medium on the wing surface is provided for in case of excessive speed or too high pressure of the driving medium and such disturbance is attained by means of an interrupting surface. It is an object of this invention to provide an interrupting surface or surfaces on the surface of the wing and preferably on the outside surface of the wing in such a way that they project out from the upper surface and into the driving medium. It is a further object that this interrupting surface shall be pivoted so that it can rotate either automatically by centrifugal force or by a suitable mechanism. A still further object is to arrange the operating mechanism on the inside of the wing in order to decrease the resistance during normal operation.

Further objects will be apparent from the following specification, taken in connection with the accompanying drawing in which like reference characters denote corresponding parts throughout, and in which—

Figure 1:
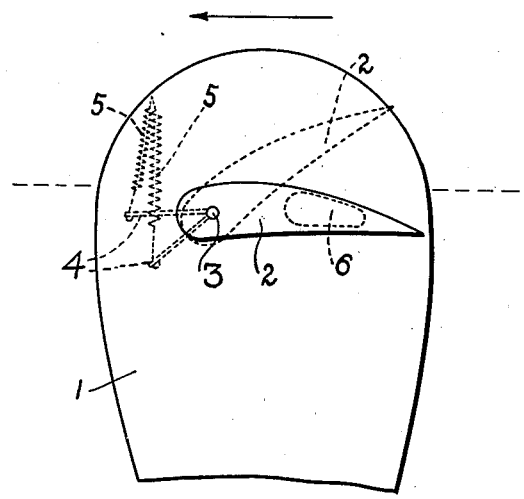
Figure 1 is a plan view showing a portion of a wing.
Figure 2:
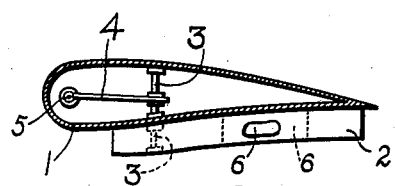
Fig. 2 is a section of the wing of Fig. 1.

Since this invention is applicable to any kind of a propeller or turbine blade and any number can be suitably included, only a portion of a wing 1 of a propeller is shown, including one interrupting surface. The stream-line interrupting surface 2 is constructed preferably in the same cross-section as that of the wing and is pivoted on an axle 3 which is secured and projects into the wing 1. On the inside of this wing an arm 4 is secured at one end to the axle 3 and has a spring 5 secured to the other or free end. This spring 5 has its other end suitably secured on the inside of the wing and as shown acts as a tension spring, although a compression spring could be used. The interrupting surface 2 is shown pivoted at one end and near its other end a weight 6 is provided so that said surface 2 will be controlled and regulated by the centrifugal force of the revolving propeller, although any other suitable controlling or regulating means could be used. During normal operation, the spring 5 will maintain the interrupting surface 2 in position substantially parallel to the circumference developed by the ends of the propeller blades but during excessive speeds the weight 6 will overcome the force of the spring 5 due to centrifugal force and will rotate the surface 2 around the point or axle 3 to the dotted line position shown in Fig. 1 whereby a resistance to the driving medium is created which will have the effect of controlling the speed of the propeller. The weight 6 is not absolutely necessary, since the surface 2 could be so constructed that its weight is sufficient to overcome the force of the spring on excessive speeds.

Other obvious modifications could be employed without departing from the scope of this invention such as providing a plurality of such surfaces for each wing and other combinations.

I claim as my invention:

The combination with a propeller, a regulating device mounted on a wing of the propeller comprising an axle rotatably secured at right angles in the wing; a stream-line interrupting surface secured to and adapted to rotate with said axle; an arm secured at one end to said axle; a tension spring secured at one end to the free end of said arm and at the other end to the wing to normally hold said surface substantially parallel to the circumference generated by the ends of the wings, said arm and the spring being mounted on the inside of said propeller; and a weight secured in said surface near the free end thereof and adapted to cause said surface to rotate due to centrifugal force against the force of said spring upon excessive speeds of the propeller.

In testimony whereof I affix my signature.

LUDWIG BLUMSCHEIN.